(12) United States Patent
Akimoto et al.

(10) Patent No.: US 10,288,526 B2
(45) Date of Patent: May 14, 2019

(54) SIGNAL PROCESSING APPARATUS FOR GAS SENSOR

(71) Applicant: DENSO CORPORATION, Kariya, Aichi-pref. (JP)

(72) Inventors: Katsuhide Akimoto, Kariya (JP); Tosihide Kumazaki, Kariya (JP); Takahito Masuko, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/513,688

(22) PCT Filed: Sep. 18, 2015

(86) PCT No.: PCT/JP2015/076757
§ 371 (c)(1),
(2) Date: Mar. 23, 2017

(87) PCT Pub. No.: WO2016/047626
PCT Pub. Date: Mar. 31, 2016

(65) Prior Publication Data
US 2017/0307477 A1    Oct. 26, 2017

(30) Foreign Application Priority Data

Sep. 24, 2014   (JP) .................................. 2014-193796

(51) Int. Cl.
*F02D 41/14*     (2006.01)
*G01M 15/10*    (2006.01)
*F01N 11/00*     (2006.01)
*F01N 13/00*     (2010.01)
*F02D 41/28*     (2006.01)

(52) U.S. Cl.
CPC ........... *G01M 15/102* (2013.01); *F01N 11/00* (2013.01); *F01N 13/008* (2013.01);
(Continued)

(58) Field of Classification Search
CPC ............. F02D 41/1454; F02D 41/1486; F02D 2200/101; F02D 2041/281;
(Continued)

(56) References Cited

U.S. PATENT DOCUMENTS 6,112,149 A * 8/2000 Varady .................... F02B 75/22
123/406.24
6,336,354 B1 * 1/2002 Suzuki ............... G01N 27/4067
338/34
(Continued)

FOREIGN PATENT DOCUMENTS

JP    2003269236 A  *  9/2003
JP    2010-203413        9/2010
(Continued)

OTHER PUBLICATIONS

Stanislaw Szwaja, Simplified Calculation of Combustion Progress in the IC Engine, 2011, TEKA Kom. Mot. Energ. Roln.—OL PAN, 11, pp. 386-396.*

(Continued)

*Primary Examiner* — Mischita L Henson
(74) *Attorney, Agent, or Firm* — Nixon & Vanderhye P.C.

(57) ABSTRACT

A signal processing apparatus for a gas sensor is applied to a gas sensor that is disposed on an exhaust passage of an engine to detect a concentration of a specific component in exhaust gas flowing through the exhaust passage. The signal processing apparatus includes a filtering means that attenuates exhaust pulsation noise included in a detection signal of the gas sensor, and a filter characteristic setting means that variably sets filter characteristics of the filtering means based on engine speed.

8 Claims, 6 Drawing Sheets

(52) U.S. Cl.
CPC ..... *F02D 41/1454* (2013.01); *F02D 41/1486* (2013.01); *F02D 41/28* (2013.01); *F02D 41/1495* (2013.01); *F02D 2041/1432* (2013.01); *F02D 2041/281* (2013.01); *F02D 2041/286* (2013.01); *F02D 2200/101* (2013.01)

(58) Field of Classification Search
CPC .......... F02D 2041/286; F02D 41/1495; F02D 2041/1432; F02D 41/28; F01N 11/00; F01N 13/008; G01M 15/02
See application file for complete search history.

(56) References Cited

U.S. PATENT DOCUMENTS

| | | | |
|---|---|---|---|
| 2005/0193804 A1* | 9/2005 | Kokubo | F02D 35/024 73/35.12 |
| 2006/0101902 A1* | 5/2006 | Christensen | G01M 15/11 73/114.04 |
| 2010/0031731 A1 | 2/2010 | Kawase et al. | |

FOREIGN PATENT DOCUMENTS

| | | |
|---|---|---|
| JP | 2010-261846 | 11/2010 |
| JP | 2011-149293 | 8/2011 |

OTHER PUBLICATIONS

English translation of International Search Report dated Dec. 28, 2015, issued in corresponding Japanese Application No. PCT/JP2015/076757 (1 page).

* cited by examiner

(a) LOW ENGINE SPEED (b) HIGH ENGINE SPEED

FIG.8

SIGNAL PROCESSING APPARATUS FOR GAS SENSOR

This application is the U.S. national phase of International Application No. PCT/JP2015/076757 filed 18 Sep. 2015, which designated the U.S. and claims priority to JP Patent Application No. 2014-193796 filed 24 Sep. 2014, the entire contents of each of which are hereby incorporated by reference.

TECHNICAL FIELD

The present invention relates to a signal processing apparatus for a gas sensor that detects a concentration of a specific component in exhaust gas from an engine.

BACKGROUND ART

This type of gas sensor is in practical use as, for example, an A/F sensor disposed on an exhaust passage of an engine. To make an actual air-fuel ratio detected by the A/F sensor agree with a target air-fuel ratio, feedback control is performed. When the engine is operated, there is a concern that noise generated due to the engine operation may be superimposed on a detection signal of the A/F sensor, resulting in decrease of the accuracy in detecting the air-fuel ratio. Thus, a technique, in which a low-pass filter circuit is provided in a control circuit part, which receives a detection signal of an A/F sensor, to remove noise by using the low-pass filter circuit, is in practical use.

In addition, for example, patent literature 1 focuses on the fact that if an exhaust pulsation occurs when a supercharger operates, the exhaust pulsation is superimposed on a sensor detection signal as noise. Patent literature 1 discloses a technique in which, in a supercharging state, a detection signal of a gas sensor is subjected to a filtering process of a filtering means, and the filter mode is corrected based on the pressure in an intake pipe.

CITATION LIST

Patent Literature

[Patent Literature 1] JP-A-2011-149293

SUMMARY OF THE INVENTION

Technical Problem

However, when a filtering process is performed for a detection signal of a gas sensor, there is a concern that a detection waveform of gas concentrations to be primarily detected may be smoothed (attenuated) in addition to the removal of noise. For example, according to the technique disclosed in Patent Literature 1, when exhaust pulsation noise superimposed on a sensor detection signal is removed, a detection waveform of gas concentrations is smoothed, resulting in the decrease in accuracy in detecting the gas concentrations. In this regard, there is a room for improvement.

Solution to Problem

An embodiment provides a signal processing apparatus for a gas sensor. The apparatus prevents a detection waveform of gas concentrations in a sensor detection signal from being smoothed unintentionally, thereby properly detecting gas concentrations.

A signal processing apparatus for a gas sensor according to an embodiment is applied to a gas sensor that is disposed on an exhaust passage of an engine to detect a concentration of a specific component in exhaust gas flowing through the exhaust passage. The signal processing apparatus includes a filtering means that attenuates exhaust pulsation noise included in a detection signal of the gas sensor, and a filter characteristic setting means that variably sets filter characteristics of the filtering means based on engine speed.

DESCRIPTION OF THE EMBODIMENTS

First Embodiment

Figure 1:
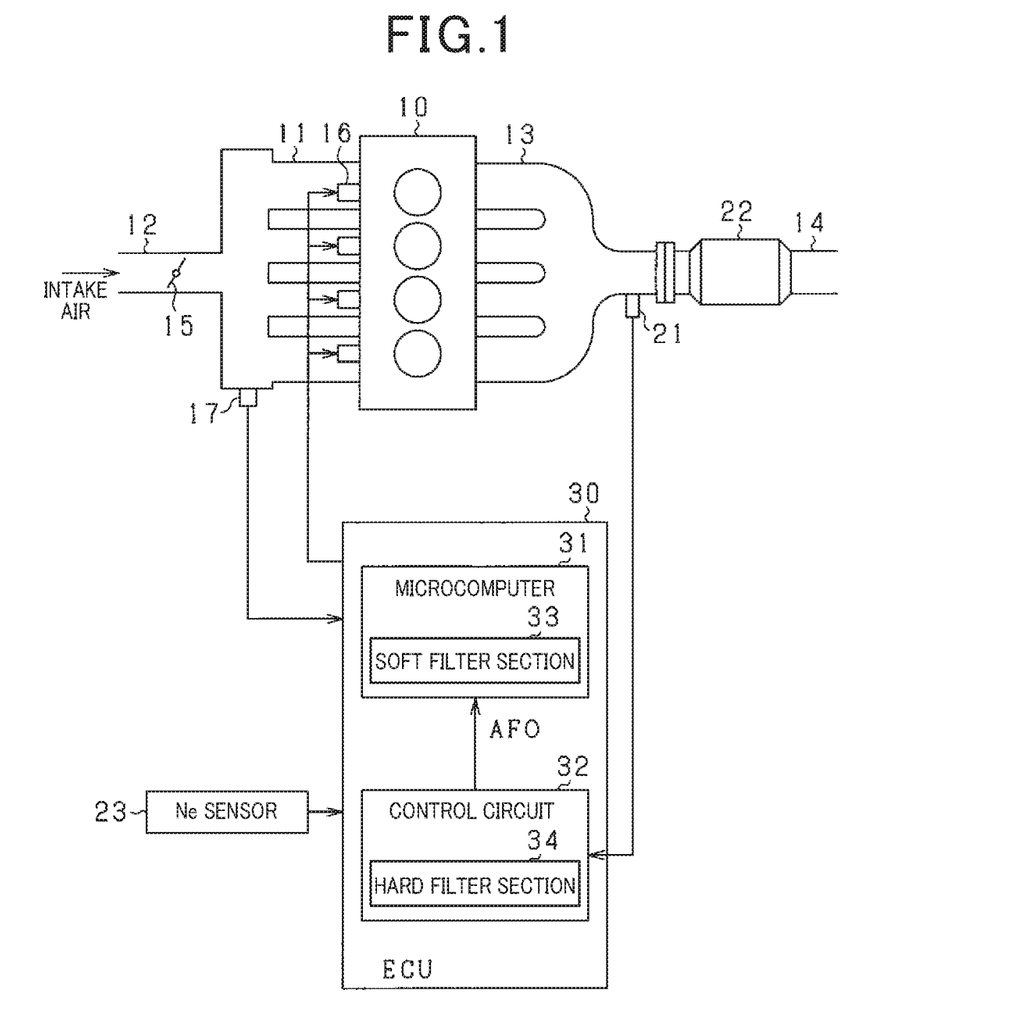
FIG. 1 is a diagram showing a schematic configuration of an engine control system.

Hereinafter, a specific embodiment of the present invention will be described with reference to the drawings. In the present embodiment, an engine control system is embodied which controls a multi-cylinder spark-ignition gasoline engine installed in a vehicle, and which controls an operating state of the engine by an electronic control unit (ECU). FIG. 1 is a diagram showing a schematic configuration of the engine control system.

In FIG. 1, an engine 10 is an inline-four 4 stroke cycle gasoline engine. The engine 10 is provided with an intake system including an intake manifold 11 and an inlet pipe 12 at the upstream side of the intake manifold 11 and an exhaust system including an exhaust manifold 13 and an outlet pipe 14 at the downstream side of the exhaust manifold 13. The intake system provides an intake passage. The exhaust system provides an exhaust passage. The inlet pipe 12 is provided with a throttle valve 15. An intake port of the engine 10 is provided with fuel injection valves 16 for respective cylinders. A collection portion (surge tank) of the intake manifold 11 is provided with an intake pressure sensor 17 for detecting inlet pipe pressure. It is noted that, instead of the port injection type engine, an in-cylinder injection type engine may be employed as the engine 10.

In addition, a collection portion of the exhaust manifold 13 is provided with an A/F sensor 21. The downstream side of the A/F sensor 21, that is, the outlet pipe 14, is provided with a catalyst 22 such as a ternary catalyst. The A/F sensor 21 has a sensor element made of a solid electrolyte such as zirconia, and generates a sensor detection signal depending on rich components (such as HC) and lean components ($O_2$) of exhaust gas to detect an air-fuel ratio (A/F) in a wide range from a rich region to a lean region. Note that other known configurations of the engine 10, such as intake and exhaust valves and an ignition system, are not shown and are not described.

In the engine 10, fuel injections are performed by the fuel injection valves 16 for respective cylinders in a predetermined combustion order (#1-#3-#4-#2). When the intake valves, not shown, open, air-fuel mixtures are introduced into combustion chambers of respective cylinders. Then, after the air-fuel mixtures are subjected to combustion in the respective cylinders, exhaust gases are exhausted to the exhaust manifold 13 in sequence when the exhaust valves, not shown, open.

The ECU 30 is mainly configured by a known microcomputer 31 having a CPU, a ROM, a RAM, and the like. The ECU 30 executes various control programs stored in the ROM to perform various controls for operation of the engine 10. Specifically, sensor detection signals are successively inputted to the engine 30 from the intake pressure sensor 17 and the A/F sensor 21 described above and an Ne sensor 23 for detecting engine speed. The microcomputer 31 performs fuel injection amount control by the fuel injection valves 16, ignition timing control by the ignition system, and the like based on various parameters indicating intake pressure, an air-fuel ratio, an engine speed, and engine operation conditions.

The ECU 30 is provided with a sensor control circuit 32. The sensor control circuit 32 includes a current measurement section and a hard filter section 34. The current measurement section measures a sensor detection signal of the A/F sensor 21 and amplifies the sensor detection signal by a predetermined amplification factor. The hard filter section 34 attenuates signal components of the sensor detection signal of the A/F sensor 21. The signal components have equal to or less than a cutoff frequency fh, which is a fixed value. The signal obtained by this process (hereinafter, sensor detection voltage AFO) is outputted to the microcomputer 31.

Figure 2:
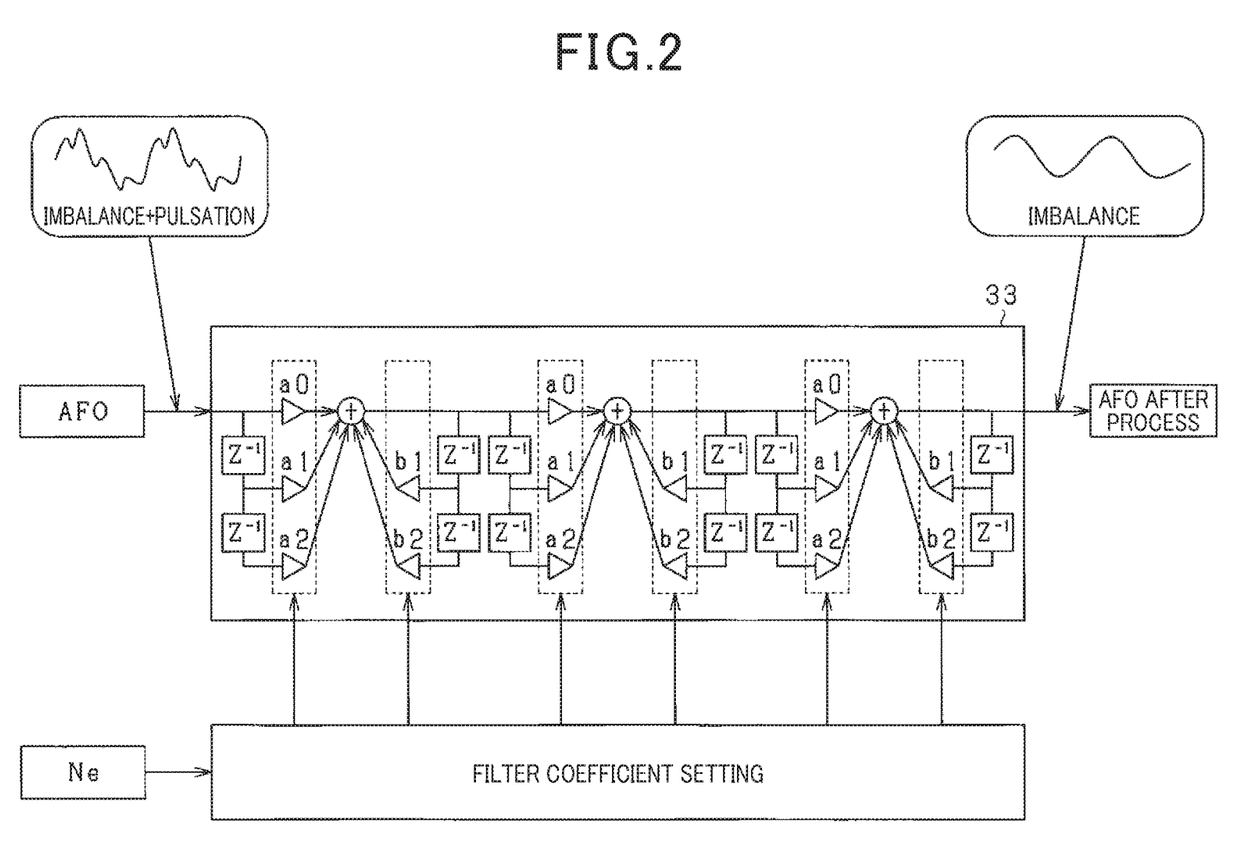
FIG. 2 is a block diagram showing a filtering process performed by IIR filters.

The microcomputer 31 includes an A/D conversion section as an input section, which receives the sensor detection voltage AFO outputted from the sensor control circuit 32. This A/D conversion section performs A/D conversion for the sensor detection voltage AFO at predetermined sampling periods (in the present embodiment, intervals of 2 msec). In addition, the microcomputer 31 includes a soft filter section 33. As shown in FIG. 2, the soft filter section 33 includes IIR filters and determines the cutoff frequency fs based on filter coefficients (a0, a1, a2, b1, b2) of the IIR filters. Thereby, signal components having the predetermined cutoff frequency fs or more included in a signal outputted from the sensor control circuit 32 are attenuated. In addition, a filter order N of the IIR filters is 3.

Specifically, in the fuel injection amount control, the microcomputer 31 performs air-fuel ratio feedback control so that an actual air-fuel ratio calculated from an output value of the A/F sensor 21 agrees with a target air-fuel ratio. In the engine 10, if an inter-cylinder variation (hereinafter, referred to as imbalance), in which the fuel injection amount becomes too small or too large due to change with time or the like, occurs in any one of the plurality of cylinders, only the exhaust from the corresponding cylinder shifts to the lean side or rich side. Due to this, an imbalance variation waveform is generated in which only a sensor waveform concerning the corresponding cylinder differs from the others.

Figure 3:
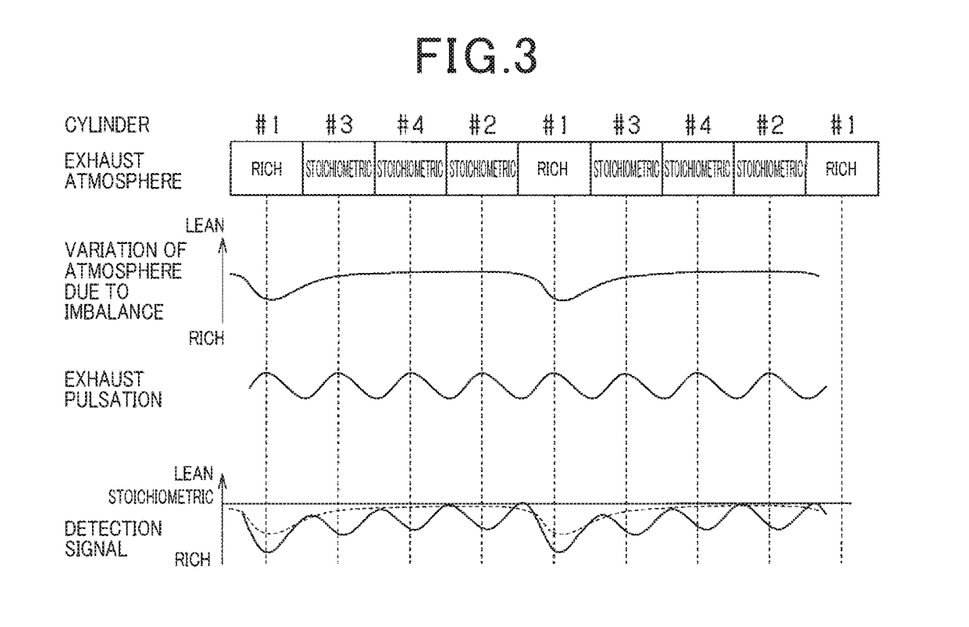
FIG. 3 is a time diagram showing an imbalance variation waveform and exhaust pulsation noise of a sensor detection signal.

For example, FIG. 3 shows a case where fuel injection is performed so that the air-fuel ratio of only one of the four cylinders becomes rich. An imbalance variation waveform is generated because gas is exhausted from a cylinder whose air-fuel ratio has been rich. That is, the A/F sensor 21 detects exhaust from the four cylinders of the engine 10 in a predetermined order and in time series. Under the condition in which stoichiometric feedback control is performed, if the air-fuel ratio of one cylinder (#1 in the figure) has become rich, an air-fuel ratio fluctuation occurs due to an imbalance at a cycle of 720° CA. Hence, it is desired that an imbalance of the air-fuel ratio is determined from a detection result of the A/F sensor 21 to perform air-fuel ratio feedback control for each of the cylinders considering the imbalance.

Meanwhile, in the engine 10, the exhaust valves are opened in accordance with combustion of the respective cylinders. Every time when the exhaust valves of the respective cylinders are opened, exhaust pressure increases. Thus, when all the cylinders are viewed, as shown in FIG. 3, an exhaust pulsation occurs at every combustion cycle (also exhaust cycle) of each of the cylinders. At this time, the number of molecules per unit volume in the outlet pipe 14 varies due to the exhaust pulsations, whereby exhaust pulsation noise is superimposed on the sensor detection voltage AFO. Hence, feedback control considering the imbalance of the air-fuel ratio may not be properly performed.

In addition, the engine speed changes every time, and an exhaust pulsation noise frequency, which is a frequency of exhaust pulsation noise, and an imbalance frequency, which is a frequency of an imbalance variation waveform, change in proportion to the engine speed.

Figure 5:
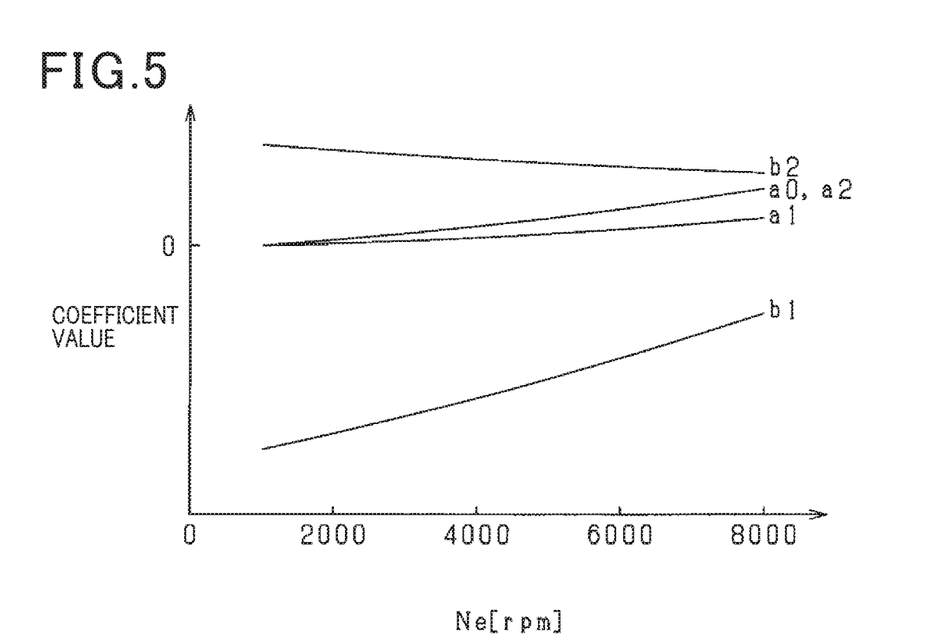
FIG. 5 is a diagram showing a correlation between engine speed and filter coefficient values.

Thus, the cutoff frequency fs is variably set based on the engine speed. Specifically, over the whole rotation range of the engine 10, filter coefficients (a0, a1, a2, b1, b2) are set so that the cutoff frequency fs has a value between a combustion frequency f1 corresponding to the exhaust pulsation noise frequency and a frequency f2 (=f1/4) obtained by dividing the combustion frequency f1 by 4, which is the number of cylinders. Specifically, filter coefficients are calculated by using the relationships shown in FIG. 5 assuming that the filter coefficients (a0, a1, a2, b1, b2) are functions of the engine speed. Hence, the cutoff frequency fs of the IIR filters is unambiguously determined between the combustion frequency f1 and the frequency f2 over the whole rotation range of the engine 10, whereby the exhaust pulsation noise is attenuated over the whole rotation range of the engine 10.

Figure 4:
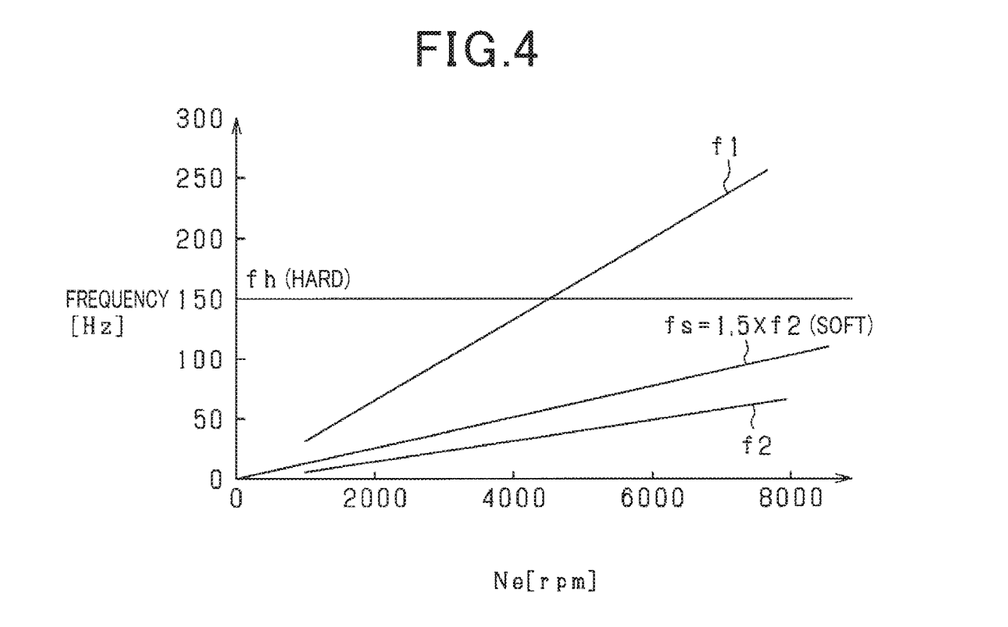
FIG. 4 is a diagram showing frequency characteristics with respect to engine speed.

Furthermore, as shown in FIG. 4, the filter coefficients of the IIR filters are set so that the cutoff frequency fs has a value (in the present embodiment, fs=1.5×f2) close to the frequency f2 in a range between the combustion frequency f1 and the frequency f2 over the whole rotation range of the engine 10. Thereby, signal components at the lower frequency side are attenuated compared with a case where the cutoff frequency fs is close to the combustion frequency f1.

As shown in FIG. 4, values of the combustion frequency f1 in the low rotation range of the engine 10 and values of the frequency f2 in the high rotation range overlap with each other. Hence, if the cutoff frequency fh of the hard filter section 34 is set to a fixed value so as to attenuate the exhaust pulsation noise in the low rotation range, the imbalance variation waveform in the high rotation range is smoothed (attenuated), whereby the imbalance variation waveform may not be properly detected. Thus, the cutoff frequency fh of the hard filter section 34 is set to a fixed value that is equal to or more than the frequency f2 in the whole rotation range of the engine 10.

Figure 6:
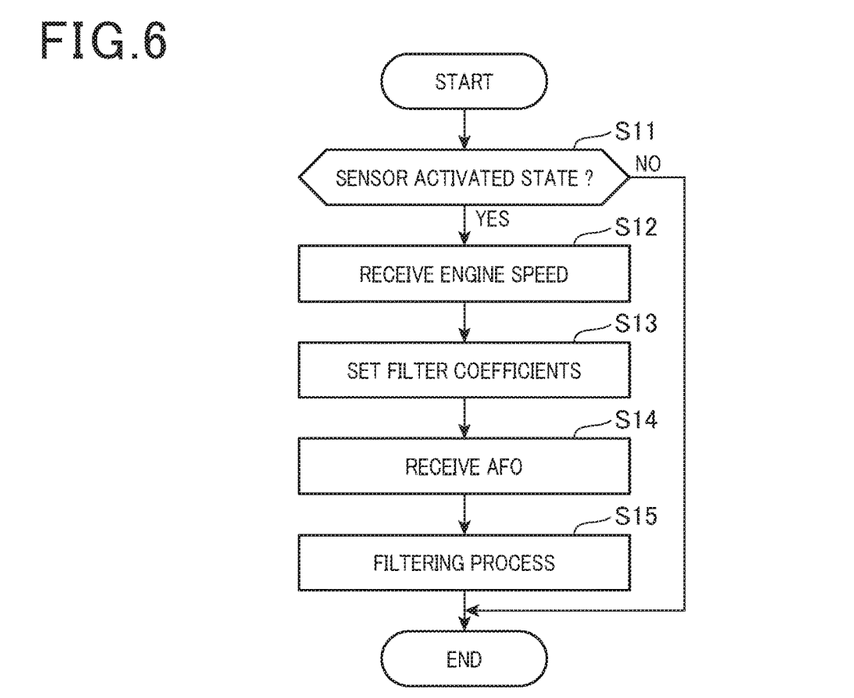
FIG. 6 is a flowchart of a filtering process according to a first embodiment.

FIG. 6 is a flowchart of a signal processing procedure for the sensor detection voltage AFO. The present process is repeatedly performed by the microcomputer 31 in the ECU 30 at predetermined time periods (in the present embodiment, intervals of 2 msec).

In FIG. 6, in step S11, the microcomputer 31 determines whether or not the A/F sensor 21 is in an activation completed state. If in an inactivated state, the present process ends. If the activation is completed, the present process proceeds to step S12. Then, in step S12, the microcomputer 31 receives engine speed, thereafter the present process proceeds to step S13.

In step S13, the microcomputer 31 sets the filter coefficients of the IIR filters in the soft filter section 33 based on the engine speed received in step S12. After the cutoff frequency fs is determined, the present process proceeds to step S14.

In step S14, the microcomputer 31 receives the sensor detection voltage AFO, then the present process proceeds to step S15. In step S15, the microcomputer 31 performs a filtering process for the sensor detection voltage AFO by the IIR filters. Then, the present process ends.

Figure 7:
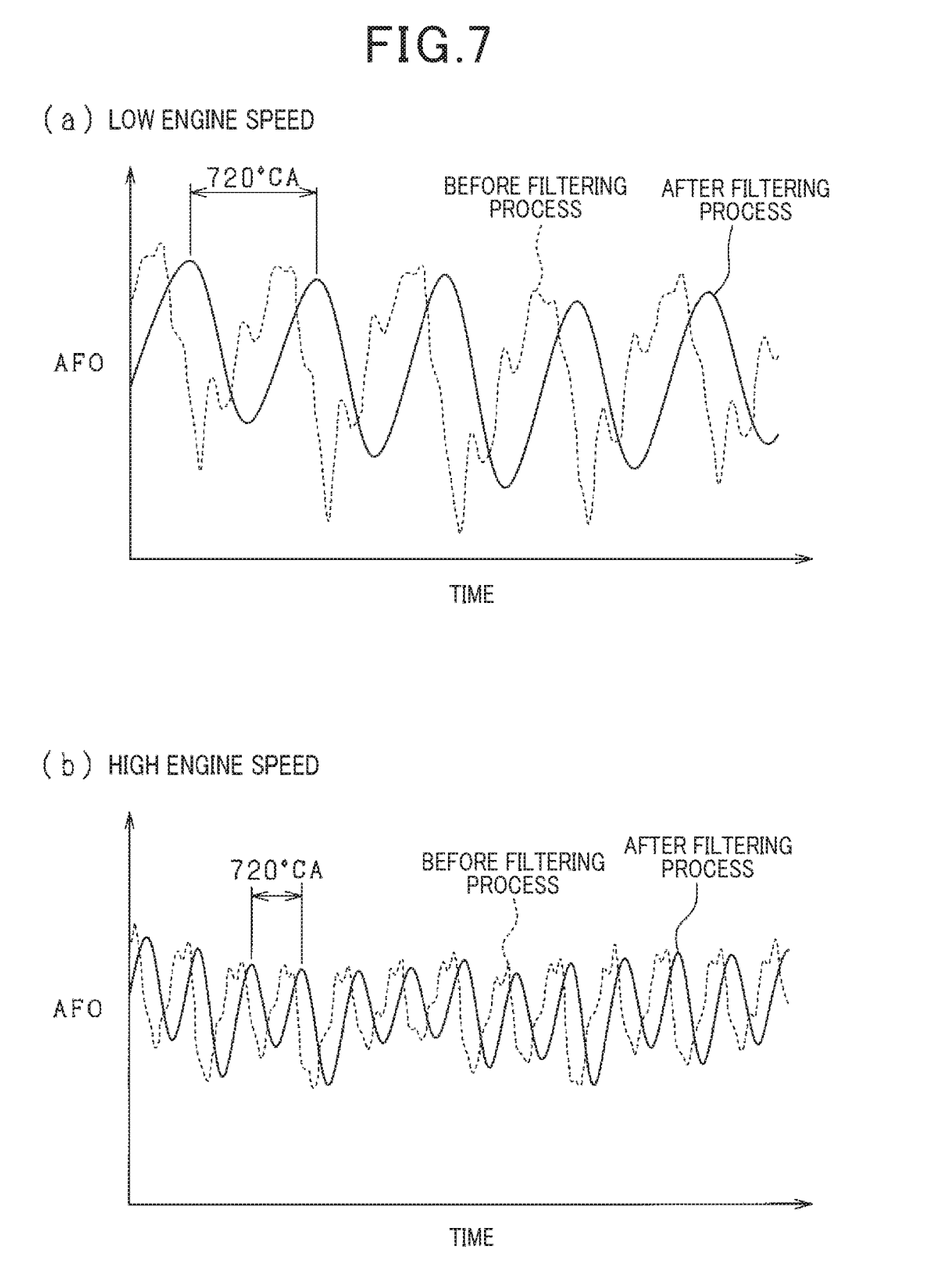
FIG. 7 includes time diagrams showing sensor detection voltages AFO before and after the filtering process in a case where engine speed is small and a case where engine speed is large.

FIG. 7(a) and FIG. 7(b) show waveforms before and after the filtering process for the sensor detection voltage AFO in cases where imbalances occur. FIG. 7(a) shows signal waveforms during low rotation. FIG. 7(b) shows signal waveforms during high rotation.

Before the filtering process, as shown in FIG. 7(a) and FIG. 7(b), the sensor detection voltage AFO greatly fluctuates at cycles of 720° CA (four cycles of exhaust pulsation noise), and the sensor detection voltage AFO slightly fluctuates at cycles of 180° CA (one cycle of exhaust pulsation noise). This is because a deviation in the air-fuel ratio has been caused in any one of the four cylinders of the engine 10 and exhaust has occurred in the four cylinders of the engine 10. It is noted that since the imbalance of the air-fuel ratio affects the fluctuation of the sensor detection voltage AFO greatly compared with the exhaust pulsation, the fluctuation of the sensor detection voltage AFO at cycles of 720° CA becomes larger. In addition, since the combustion cycle of the engine 10 is shorter in a case where the engine speed is high than in a case where the engine speed is low, the cycle of the exhaust pulsation noise and the period of imbalance variation waveform are shorter in the case where the engine speed is high.

After the filtering process, as shown in FIG. 7(a) and FIG. 7(b), regardless of the engine speed, the imbalance variation waveform is prevented from being smoothed while the exhaust pulsation noise is properly attenuated. That is, since the cutoff frequency fs is changed based on the engine speed in the soft filter section 33, the exhaust pulsation noise is attenuated in the whole rotation range of the engine 10.

According to the present embodiment, the following advantageous effects can be provided.

The present embodiment has a configuration in which the cutoff frequency fs of the soft filter section 33 including the IIR filters is variably set based on the engine speed. Hence, the exhaust pulsation noise is properly attenuated in the whole rotation range of the engine 10 by the soft filter section 33, and the imbalance variation waveform is prevented from being smoothed. As a result, an air-fuel ratio can be properly detected while sensor responsiveness is ensured.

The present embodiment has a configuration in which the cutoff frequency fs is set between the combustion frequency f1 and the frequency f2 obtained by dividing the combustion frequency f1 by 4, which is the number of cylinders. According to this configuration, when exhaust components from any one of the four cylinders differ from those of the other cylinders, whereby an imbalance variation waveform is generated in which only the sensor waveform concerning the corresponding cylinder differs from the others, the imbalance variation waveform is prevented from being smoothed while the exhaust pulsation noise superimposed on the imbalance variation waveform is attenuated. Hence, the imbalance can be properly determined.

The present embodiment has a configuration in which the cutoff frequency fs is set so as to be close to the frequency f2 in a range between the combustion frequency f1 and the frequency f2. According to this configuration, the attenuation band is wide and the passband is narrow, compared with a case where the cutoff frequency fs is close to the combustion frequency f1. Hence, only the imbalance variation waveform in the passband is properly extracted. Thereby, the imbalance can be properly determined.

Second Embodiment

Hereinafter, the second embodiment will be described with reference to the drawings, focusing on the differences from the first embodiment. This embodiment differs from the first embodiment in that the filter order N is changed based on an engine load.

The microcomputer 31 variably sets the filter order N of the soft filter section 33 based on an engine load. Specifically, since exhaust pressure becomes large when an engine load is a high load, it is easy for the exhaust pulsation noise to greatly affect the accuracy in detecting an imbalance variation waveform. Thus, the exhaust pulsation noise is preferentially attenuated by heightening the filter order N. In contrast, since exhaust pressure becomes small when the engine load is a low load, it is difficult for the exhaust pulsation noise to affect the accuracy in detecting an imbalance variation waveform. Thus, the imbalance variation waveform is preferentially prevented from being smoothed by lowering the filter order N. Specifically, in the low rotation range, the difference between an exhaust pulsation frequency and an imbalance frequency is small. Hence, variably setting the filter order N can prevent the imbalance waveform from being unnecessarily smoothed, and sensor responsiveness can be ensured.

Thus, in the present embodiment, the microcomputer 31 variably sets the filter order N based on the intake pressure outputted from the intake pressure sensor 17 as an engine load. Specifically, when the intake pressure is small, the filter order N is set to be small. Hence, the imbalance variation waveform can be prevented from being smoothed depending on the engine load.

Figure 8:
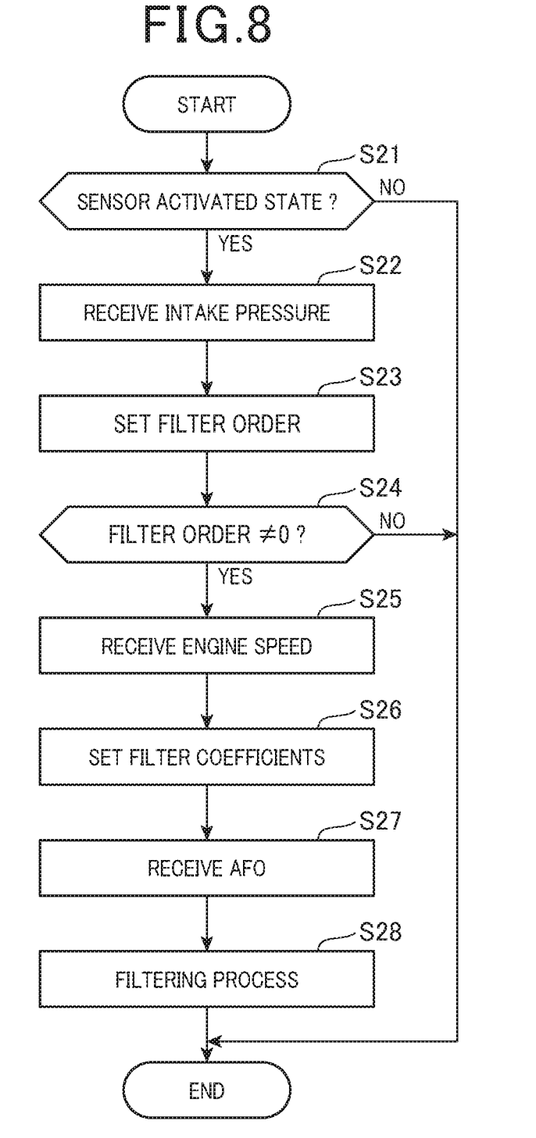
FIG. 8 is a flowchart of a filtering process of a second embodiment.

FIG. 8 is a flowchart of a signal processing procedure for the sensor detection voltage AFO. The present process is repeatedly performed by the microcomputer 31 in the ECU 30 at predetermined time periods (in the present embodiment, intervals of 2 msec).

In FIG. 8, in step S21, the microcomputer 31 determines whether or not the A/F sensor 21 is in an activation completed state. If in an inactivated state, the microcomputer 31 ends the present process. If the activation is completed, the present process proceeds to step S22.

In step S22, the microcomputer 31 receives intake pressure detected by the intake pressure sensor 17. After receiving the intake pressure, in step S23, the microcomputer 31 sets the filter order N based on the intake pressure received in step S22. Here, the filter order N is set in a range of 0 to 3. For example, N=0 is set during idling, and the filter order N is set to be larger as the engine load becomes larger. It is noted that a configuration may be implemented in which the filter order N is set in a range of 1 to 3. After the filter order N is set, the present process proceeds to step S24.

In step S24, the microcomputer 31 determines whether or not the filter order N set in step S23 is other than 0. If negative determination is made in step S24, the present process is halted. If positive determination is made in step S24, the present process proceeds to step S25.

Then, processes in step S25 to step S28 are similar to step S12 to step S15 in FIG. 6 described above. Based on these processes, a filtering process is performed by the IIR filters in which the filter coefficients are set. Then, the present process ends.

As described above, the present embodiment has a configuration in which filter coefficients are variably set based on engine speed, and the filter order N is variably set based on intake pressure.

Hence, a filtering process is performed depending on the change in the frequency of exhaust pulsation noise and the change in the magnitude of exhaust pulsation to prevent an imbalance variation waveform from being smoothed while the exhaust pulsation noise is attenuated. As a result, an air-fuel ratio can be properly detected while sensor responsiveness is ensured.

Other Embodiments

The above embodiments may be modified, for example, as below.

In the first embodiment, filter coefficients of the IIR filters are set so that the cutoff frequency fs has a value close to the frequency f2. The filter coefficients of the IIR filters may be set so that the cutoff frequency fs has a value close to the combustion frequency f1. This considers that, in an actual filtering process, signal components of frequencies lower than the cutoff frequency fs are also attenuated in the vicinity of the cutoff frequency fs. Thus, compared with a case where the cutoff frequency fs is a value close to the frequency f2, the imbalance variation waveform can be prevented from being smoothed, and sensor responsiveness can be ensured.

The first embodiment is configured so that as engine speed is higher, the cutoff frequency fs is set to be higher. In addition to this, as the engine speed is higher, the filter order N may be set to be lower. As shown in FIG. 4, as the engine speed is higher, the difference between the exhaust pulsation noise frequency and the imbalance frequency becomes larger. Thereby, in the high rotation range, it is difficult for the exhaust pulsation noise to affect the accuracy in detecting an imbalance variation waveform. Thus, the imbalance variation waveform is preferentially prevented from being smoothed by lowering the filter order N. In contrast, as the engine speed is lower, the difference between the exhaust pulsation noise frequency and the imbalance frequency becomes smaller. Thereby, in the low rotation range, it is easy for the exhaust pulsation noise to affect the accuracy in detecting an imbalance variation waveform. Thus, the exhaust pulsation noise is preferentially attenuated by heightening the filter order N. Hence, the imbalance variation waveform is prevented from being smoothed while the exhaust pulsation noise is attenuated. As a result, an air-fuel ratio can be properly detected while sensor responsiveness is ensured.

The second embodiment is configured so that as an engine load is lighter, the filter order N becomes lower. Even when the engine load is heavy, the filter order N may be made low if the engine speed is high. This considers that as the engine speed is higher, the accuracy in detecting an exhaust pulsation frequency is not easily affected. Hence, when the engine speed is high, the filter order N is made low to prevent the imbalance variation waveform from being smoothed while the exhaust pulsation noise is attenuated. As a result, an air-fuel ratio can be properly detected while sensor responsiveness is ensured.

Although the soft filter section 33 is configured to have IIR filters, instead of these, the soft filter section 33 may be configured to have other digital filters such as FIR filters. Such a configuration can also change filter characteristics by variably setting filter coefficients and the filter order N. Hence, the imbalance variation waveform is prevented from being smoothed while the exhaust pulsation noise is properly attenuated.

The sampling period is set to a predetermined time period (interval of 2 msec). Instead of this, the sampling period may be in synchronization with a predetermined crank angle cycle. According to this configuration, the sampling period changes depending on the change of the crank angle cycle.

In the soft filter section 33, the sampling period and a period of performing the filtering process may be set so as to be different from each other. For example, the sampling period may be set to 2 msec, and the period of performing the filtering process may be set to 10 msec to perform the filtering process intermittently with respect to the sampling period. Thus, the load of calculation of the ECU 30 for the filtering process can be reduced.

The above embodiment is configured so that the A/F sensor 21 is applied to an in-line four cylinder engine and is provided to the collection portion of the exhaust manifold 13. The A/F sensor 21 can be applied to an engine having a plurality of cylinders having a common exhaust system and detecting an air-fuel ratio by a common gas sensor. For example, the A/F sensors 21 may be respectively applied to a plurality of banks of an engine such as a V-type engine.

The present embodiment provides a signal processing apparatus for a gas sensor that is disposed on an exhaust passage of an engine to detect a concentration of a specific component in exhaust gas flowing through the exhaust passage. This signal processing apparatus includes a filtering means that attenuates exhaust pulsation noise included in a detection signal of the gas sensor and a filter characteristic setting means that variably sets filter characteristics of the filtering means.

If an exhaust pulsation occurs in the exhaust passage, and exhaust pulsation noise generated due to the exhaust pulsation is superimposed on a detection signal of the gas sensor, the accuracy in detecting a gas concentration is affected. However, using the filtering means can attenuate the exhaust pulsation noise. However, there is a concern that the detection waveform of the gas concentration may be smoothed due to the attenuation of the noise, resulting in lowering of sensor responsiveness. In this case, since the frequency of the exhaust pulsation noise changes depending on the engine speed, disadvantages are not provided, for example, in the low rotation range. However, disadvantages may occur in the high rotation range. In this regard, variably setting filter characteristics of the filtering means based on the engine speed can prevent the detection waveform of the gas concentration from being smoothed while the exhaust pulsation noise is attenuated. As a result, the gas concentration can be properly detected while sensor responsiveness is ensured.

REFERENCE SIGNS LIST

10: engine 14: outlet pipe (exhaust passage)
21: A/F sensor (gas sensor)
30: ECU (filtering means, filter characteristic setting means

The invention claimed is:

1. A signal processing apparatus for a gas sensor that is disposed on an exhaust passage of an engine to detect a concentration of a specific component in exhaust gas flowing through the exhaust passage, the apparatus comprising:
   a filtering means that attenuates exhaust pulsation noise included in a detection signal of the gas sensor; and
   a filter characteristic setting means that variably sets filter characteristics of the filtering means based on engine speed, wherein
   the engine is a multi-cylinder engine which has a plurality of cylinders having a common exhaust system and detects a gas concentration by the gas sensor used in common, and in which fuel injected from a fuel injecting means into each of the cylinders burns,
   the filtering means is a low-pass filter having a passband including frequencies lower than a cutoff frequency, and
   the filter characteristic setting means sets the cutoff frequency between a combustion frequency f1 of the plurality of cylinders and a frequency f2 (=f1/n) obtained by dividing the combustion frequency f1 by n, which is the number of cylinders.

2. The signal processing apparatus for a gas sensor according to claim 1, wherein
   the filter characteristic setting means sets the cutoff frequency so as to be close to the frequency f2 in a range between the combustion frequency f1 and the frequency f2.

3. The signal processing apparatus for a gas sensor according to claim 1, wherein
   the filter characteristic setting means variably sets a filter order based on engine speed.

4. The signal processing apparatus for a gas sensor according to claim 3, wherein
   when the engine speed is high, the filter characteristic setting means sets the filter order lower compared with a case where the engine speed is low.

5. The signal processing apparatus for a gas sensor according to claim 1, wherein
   the filter characteristic setting means variably sets the filter order based on an engine load.

6. The signal processing apparatus for a gas sensor according to claim 5, wherein
   when the engine load is a low load, the filter characteristic setting means sets the filter order lower compared with a case where the engine load is a high load.

7. The signal processing apparatus for a gas sensor according to claim 1, wherein the filter characteristic setting means:
   determines the combustion frequency f1 of the plurality of cylinders;
   determines n, which is the number of cylinders;
   divides the combustion frequency f1 by n, which is the number of cylinders, to calculate the frequency f2 (=f1/n); and
   defines a range for setting the cutoff frequency, the range being defined between the combustion frequency f1 of the plurality of cylinders and the frequency f2 (=f1/n) calculated by dividing the combustion frequency f1 by n, which is the number of cylinders.

8. The signal processing apparatus for a gas sensor according to claim 1, wherein:
   when exhaust components from any one of the plurality of cylinders differ from those of the other cylinders and whereby an imbalance variation waveform at the frequency f2 is generated, the imbalance variation waveform at the frequency f2 is passed by the filtering means but is prevented from being smoothed while the exhaust pulsation noise in the detection signal at frequency f1 and superimposed on the imbalance variation waveform is attenuated.

\* \* \* \* \*